United States Patent
Chauhan et al.

(10) Patent No.: US 12,476,460 B2
(45) Date of Patent: Nov. 18, 2025

(54) REINFORCEMENT LEARNING AND HEURISTIC BASED REAL TIME POWER GRID MANAGEMENT

(71) Applicant: Tata Consultancy Services Limited, Mumbai (IN)

(72) Inventors: Anandsingh Chauhan, Thane West (IN); Mayank Baranwal, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 391 days.

(21) Appl. No.: 18/348,952

(22) Filed: Jul. 7, 2023

(65) Prior Publication Data

US 2024/0186789 A1    Jun. 6, 2024

(30) Foreign Application Priority Data

Dec. 2, 2022   (IN) .............................. 202221069773

(51) Int. Cl.
    *H02J 3/00* (2006.01)
(52) U.S. Cl.
    CPC ....... *H02J 3/00125* (2020.01); *H02J 2203/10* (2020.01); *H02J 2203/20* (2020.01)
(58) Field of Classification Search
    CPC . H02J 3/00125; H02J 2203/10; H02J 2203/20
    See application file for complete search history.

(56) References Cited

U.S. PATENT DOCUMENTS

| | | | |
|---|---|---|---|
| 11,159,046 B1* | 10/2021 | Kreikebaum | G05B 13/024 |
| 2016/0281607 A1* | 9/2016 | Asati | F02C 7/26 |

(Continued)

OTHER PUBLICATIONS

Pan, Alexander et al., "Improving Robustness of Reinforcement Learning for Power System Control with Adversarial Training", Title of the item: 22nd Power Systems Computation Conference, Date: 2022, Publisher: PSCC, Link: https://arxiv.org/pdf/2110.08956.pdf.

(Continued)

*Primary Examiner* — Ziaul Karim
(74) *Attorney, Agent, or Firm* — Finnegan, Henderson, Farabow, Garrett & Dunner, LLP

(57) ABSTRACT

The challenge in managing power grid networks lies not only in dealing with the uncertainty of power demand and generation, or the uncertain events, but also with the huge action space even in a moderately-sized grid. In most such scenarios, the grid operator relies on his/her own experience or at best, some of the potential heuristics whose scope is limited to mitigating only a certain type of uncertainties. The present disclosure provides a heuristic-guided RL framework, for robust control of power networks subjected to production and demand uncertainty, as well as adversarial attacks. Using a careful action selection process, in combination with line reconnection and recovery heuristics, equips the present disclosure to outperform conventional approaches on several challenge datasets even with reduced action space. The present disclosure not only diversifies its actions across substations, but also learns to identify important action sequences to protect the network against targeted adversarial attacks.

12 Claims, 5 Drawing Sheets

(56) References Cited

U.S. PATENT DOCUMENTS

| | | | |
|---|---|---|---|
| 2022/0221499 A1* | 7/2022 | Cho | G01R 19/2513 |
| 2022/0329099 A1* | 10/2022 | Mohan | G06F 3/0484 |
| 2023/0170699 A1* | 6/2023 | Kreikebaum | H02J 3/06 |
| | | | 700/298 |
| 2024/0186789 A1* | 6/2024 | Chauhan | H02J 3/00125 |

OTHER PUBLICATIONS

Zhou, Yuhao et al., "A Data-driven Method for Fast AC Optimal Power Flow Solutions via Deep Reinforcement Learning", Title of the item: Journal of Modern Power Systems and Clean Energy, Date: Nov. 2020, vol. 8; Issue: 6, Publisher: ResearchGate, Link: https://www.researchgate.net/publication/347325692_A_Data-driven_Method_for_Fast_AC_Optimal_Power_Flow_Solutions_via_Deep_Reinforcement_Learning.

Zhang, Bei et al., "Real-time Autonomous Line Flow Control Using Proximal Policy Optimization", Date: 2020, Publisher: MDPI, Link: http://www.csee.org/cn/pic/u/cms/www/202006/081700236r99.pdf.

Duan, Jiajun et al., "Deep-Reinforcement-Learning-Based Autonomous Voltage Control for Power Grid Operations", Title of the item: IEEE Transactions on Sep. 2019, Date: Sep. 2019, Publisher: IEEE, Link: https://www.researchgate.net/publication/336779994_Deep-Reinforcement-Learning-Based_Autonomous_Voltage_Control_for_Power_Grid_Operations.

Marot, Antoine et al., "Learning to run a power network challenge for training topology controllers", Title of the item: Electric Power Systems Research, Date: 2020, vol. 189, Publisher: Eslevier, Link: https:arxiv.org/abs/1912.04211.

\* cited by examiner

REINFORCEMENT LEARNING AND HEURISTIC BASED REAL TIME POWER GRID MANAGEMENT

PRIORITY CLAIM

This U.S. patent application claims priority under 35 U.S.C. § 119 to: India Application No. 202221069773, filed on Dec. 2, 2022. The entire contents of the aforementioned application are incorporated herein by reference.

TECHNICAL FIELD

The disclosure herein generally relates to the field of power grid management and, more particularly, to a method and system for reinforcement learning and heuristic based real time power grid management.

BACKGROUND

Renewable energy sources, such as solar or wind, depend heavily on the weather conditions. Thus, while the current topology may be adept at handling the net load demand, a significant change in power generation due to change in weather conditions may force the operator to take immediate remedial action in order to avoid transmission loss failures or eventual blackouts. Power grids, across the world, play an important societal and economical role by providing uninterrupted, reliable and transient-free power to several industries, businesses and household consumers. Hence due to uncertain generation and highly dynamic load demands, it has become ever so important to ensure robust operation of power networks through suitable management of transient stability issues and localize the events of blackouts.

Conventional Artificial Intelligence (AI) guided approaches introduce a deep-learning based approach for remedial actions comprising of line disconnection/reconnection in a fixed-topology network. However, these approaches do not explore combinatorial topological actions. Some other conventional methods proposed an expert system for topological remedial actions, which was further improved using a simple RL-based framework. Some more conventional methods include a dueling Deep Q-network (DDQN) with prioritized replay buffer only to act in contingency situations. Yet another conventional method adopted a Graph Neural Network (GNN) based actor-critic method to find the goal topology of the network given the current state did not perform nearly as well when applied to more complex scenarios. Thus, it is important to ensure robust operation of power networks through suitable management of transient stability issues and localize the events of blackouts. However, there hardly exist solutions providing reliable and robust power grid management to mitigate the effects of adversarial attacks on transmission lines (uncertain events), as well as temporal variations in demand and supply.

SUMMARY

Embodiments of the present disclosure present technological improvements as solutions to one or more of the above-mentioned technical problems recognized by the inventors in conventional systems. For example, in one embodiment, a method for reinforcement learning and heuristic based real time power grid management is provided. The method includes receiving, by one or more hardware processors, a real time data pertaining to a power grid network using a real time data acquisition system. Further, the method includes simulating, via the one or more hardware processors, a maximum line current overflow ratio of the power grid network for a future timestep based on the real time data using a simulation technique. Furthermore, the method includes computing, via the one or more hardware processors, a critical value of the power grid network for the future timestep based on a comparison between the simulated maximum line current overflow ratio and a predefined safety threshold value, wherein the critical value is set to one if the simulated maximum line current overflow ratio is greater than the predefined safety threshold value and zero otherwise. Furthermore, the method includes generating, via the one or more hardware processors, a normalized data based on the received real time data using a normalization technique if the critical value is set to one, wherein one of a) line reconnection action and b) grid recovery action is performed if the critical value is set to zero. Furthermore, the method includes predicting, via the one or more hardware processors, a remedial power grid network topology based on the normalized data using a pretrained Reinforcement Learning (RL) technique, wherein the RL technique selects a remedial power grid network topology with a maximum reward. Furthermore, the method includes recomputing, via the one or more hardware processors, the critical value of the power grid network by simulating the remedial power grid network topology using the simulation technique. Furthermore, the method includes applying, via the one or more hardware processors, a remedial power grid topological reconfiguration action associated with the simulated remedial power grid network in the power grid network in conjunction with a line action if any, only if, a) a recomputed critical value is less than the predefined safety threshold value and b) the predicted remedial power grid network topology is different from a current topology. Furthermore, the method includes selecting, via the one or more hardware processors, an optimal heuristic based topology from a plurality of topology heuristics based on the real time data if the critical value is greater than the predefined safety threshold obtained by the pretrained RL technique. Finally, the method includes applying, via the one or more hardware processors, a topological reconfiguration action associated with the optimal heuristic based topology in conjunction with the line action if any only if the corresponding critical value is less than the critical value associated with the remedial power grid network topology predicted by the pretrained RL technique, wherein the remedial power grid network topology predicted by the pretrained RL technique is selected otherwise.

In another aspect, a system for reinforcement learning and heuristic based real time power grid management is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a real time data pertaining to a power grid network using a real time data acquisition system. Further, the one or more hardware processors are configured by the programmed instructions to simulate a maximum line current overflow ratio of the power grid network for a future timestep based on the real time data using a simulation technique. Furthermore, the one or more hardware processors are configured by the programmed instructions to compute a critical value of the power grid network for the future timestep based on a comparison between the simulated maximum line current overflow ratio and a predefined safety threshold value, wherein the critical value is set to one if the simulated maximum line current overflow ratio is greater than the predefined safety threshold value and zero otherwise. Furthermore, the one or more hardware processors are configured by the programmed instructions to generate a normalized data based on the received real time data using a normalization technique if the critical value is set to one, wherein one of a) line reconnection action and b) grid recovery action is performed if the critical value is set to zero. Furthermore, the one or more hardware processors are configured by the programmed instructions to predict a remedial power grid network topology based on the normalized data using a pretrained Reinforcement Learning (RL) technique, wherein the RL technique selects a remedial power grid network topology with a maximum reward. Furthermore, the one or more hardware processors are configured by the programmed instructions to recompute the critical value of the power grid network by simulating the remedial power grid network topology using the simulation technique. Furthermore, the one or more hardware processors are configured by the programmed instructions to apply, a remedial power grid topological reconfiguration action associated with the simulated remedial power grid network in the power grid network in conjunction with a line action if any, only if, a) a recomputed critical value is less than the predefined safety threshold value and b) the predicted remedial power grid network topology is different from a current topology. Furthermore, the one or more hardware processors are configured by the programmed instructions to select an optimal heuristic based topology from a plurality of topology heuristics based on the real time data if the critical value is greater than the predefined safety threshold obtained by the pretrained RL technique. Finally, the one or more hardware processors are configured by the programmed instructions to apply a topological reconfiguration action associated with the optimal heuristic based topology in conjunction with the line action if any only if the corresponding critical value is less than the critical value associated with the remedial power grid network topology predicted by the pretrained RL technique, wherein the remedial power grid network topology predicted by the pretrained RL technique is selected otherwise.

In yet another aspect, a computer program product including a non-transitory computer-readable medium having embodied therein a computer program for reinforcement learning and heuristic based real time power grid management is provided. The computer readable program, when executed on a computing device, causes the computing device to receive a real time data pertaining to a power grid network using a real time data acquisition system. Further, the computer readable program, when executed on a computing device, causes the computing device to simulate a maximum line current overflow ratio of the power grid network for a future timestep based on the real time data using a simulation technique. Furthermore, the computer readable program, when executed on a computing device, causes the computing device to compute a critical value of the power grid network for the future timestep based on a comparison between the simulated maximum line current overflow ratio and a predefined safety threshold value, wherein the critical value is set to one if the simulated maximum line current overflow ratio is greater than the predefined safety threshold value and zero otherwise. Furthermore, the computer readable program, when executed on a computing device, causes the computing device to generate a normalized data based on the received real time data using a normalization technique if the critical value is set to one, wherein one of a) line reconnection action and b) grid recovery action is performed if the critical value is set to zero. Furthermore, the computer readable program, when executed on a computing device, causes the computing device to predict a remedial power grid network topology based on the normalized data using a pretrained Reinforcement Learning (RL) technique, wherein the RL technique selects a remedial power grid network topology with a maximum reward. Furthermore, the computer readable program, when executed on a computing device, causes the computing device to recompute the critical value of the power grid network by simulating the remedial power grid network topology using the simulation technique. Furthermore, the computer readable program, when executed on a computing device, causes the computing device to apply, a remedial power grid topological reconfiguration action associated with the simulated remedial power grid network in the power grid network in conjunction with a line action if any, only if, a) a recomputed critical value is less than the predefined safety threshold value and b) the predicted remedial power grid network topology is different from a current topology. Furthermore, the computer readable program, when executed on a computing device, causes the computing device to select an optimal heuristic based topology from a plurality of topology heuristics based on the real time data if the critical value is greater than the predefined safety threshold obtained by the pretrained RL technique. Finally, the computer readable program, when executed on a computing device, causes the computing device to apply a topological reconfiguration action associated with the optimal heuristic based topology in conjunction with the line action if any only if the corresponding critical value is less than the critical value associated with the remedial power grid network topology predicted by the pretrained RL technique, wherein the remedial power grid network topology predicted by the pretrained RL technique is selected otherwise.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
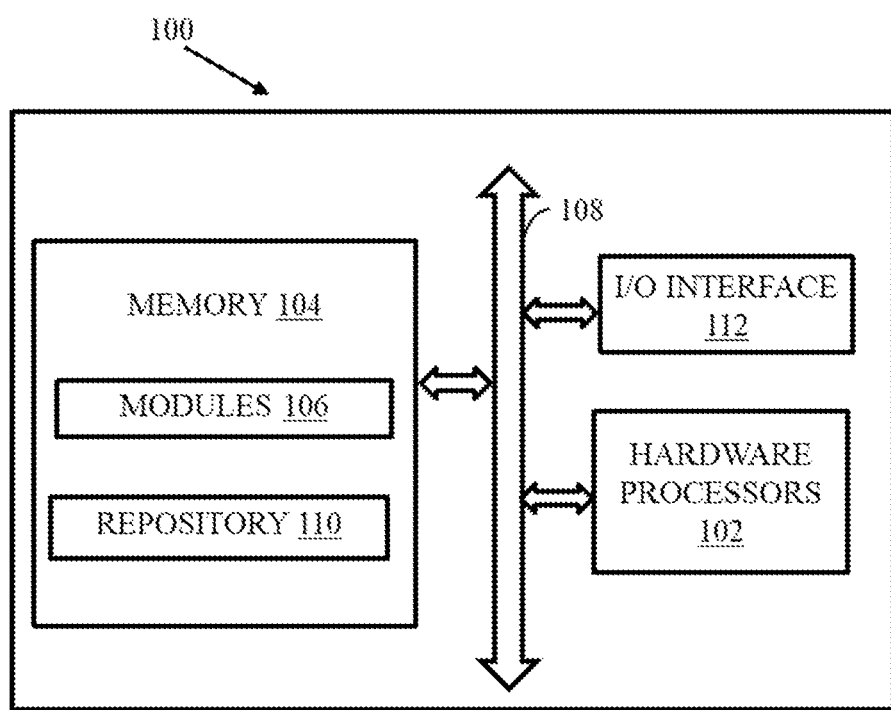
FIG. 1 is a functional block diagram of a system for reinforcement learning and heuristic based real time power grid management, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The challenge in managing/controlling power grid networks lies not only in dealing with the uncertainty of power demand and generation, or the uncertain events, such as electrical faults or adversarial attacks on the grid, but also with the huge (combinatorially large) action space even in a moderately-sized grid. From the perspective of the grid operator, devising a real-time strategy for the robust management of power networks is beyond human cognition. In most such scenarios, the grid operator relies on his/her own experience or at best, some of the potential heuristics whose scope is limited to mitigate only a certain type of uncertainties.

To overcome the challenges identified in the conventional approaches, the present disclosure presents a reinforcement learning (RL) framework to mitigate the effects of unexpected network events, as well as reliably maintain electricity everywhere on the network. The present disclosure leverages a novel heuristic for overload management, along with the RL-guided decision making on optimal topology selection to ensure that the grid is operated safely and reliably (with no overloads). Further, the present disclosure is benchmarked on a variety of competition datasets hosted by the L2RPN (Learning to Run a Power Network). Even with its reduced action space, the present disclosure tops the leaderboard in the robustness track at an aggregate level.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a reinforcement learning and heuristic based real time power grid management, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
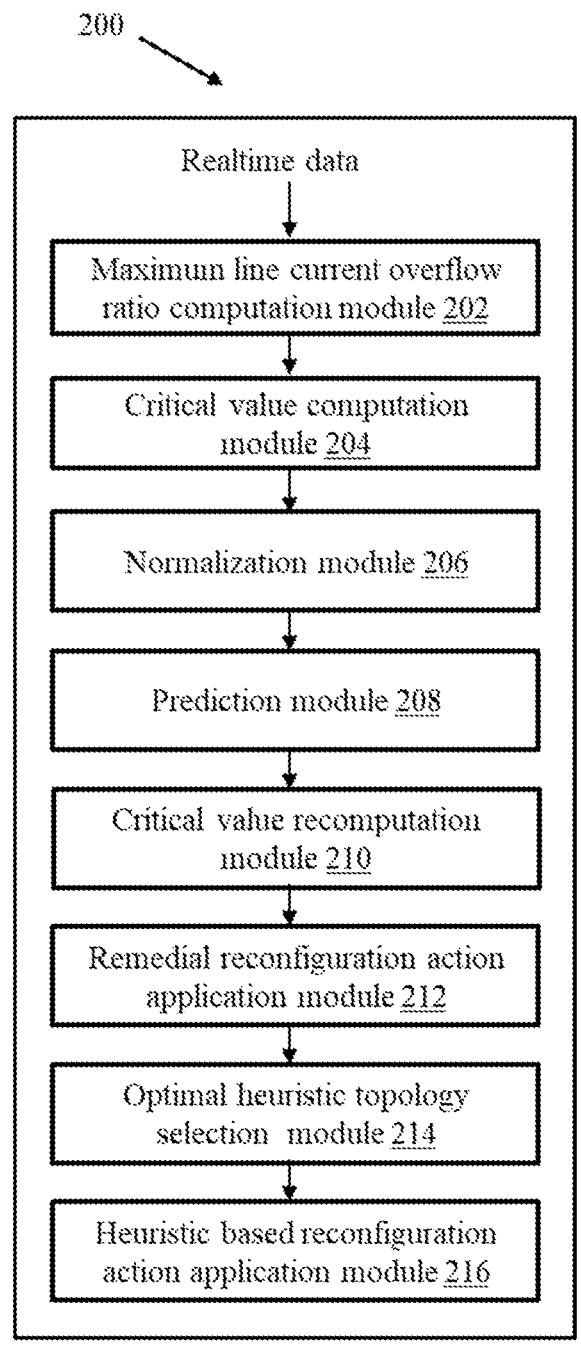
FIG. 2 illustrates a functional architecture of the system of FIG. 1, for reinforcement learning and heuristic based real time power grid management, in accordance with some embodiments of the present disclosure.

The plurality of modules 106 include programs or coded instructions that supplement applications or functions performed by the system 100 for reinforcement learning and heuristic based real time power grid management. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the reinforcement learning and heuristic based real time power grid management. In an embodiment, the modules 106 includes a maximum line current overflow ratio computation module (shown in FIG. 2) and a critical value computation module (shown in FIG. 2), a normalization module (shown in FIG. 2), a prediction module (shown in FIG. 2), a critical value re-computation module (shown in FIG. 2), a remedial reconfiguration action application module (shown in FIG. 2), an optimal heuristic topology selection module (shown in FIG. 2) and a heuristic based reconfiguration action application module (shown in FIG. 2). In an embodiment, FIG. 2 illustrates a functional architecture of the system of FIG. 1, for reinforcement learning and heuristic based real time power grid management, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIGS. 3A and 3B.

Figure 3A:
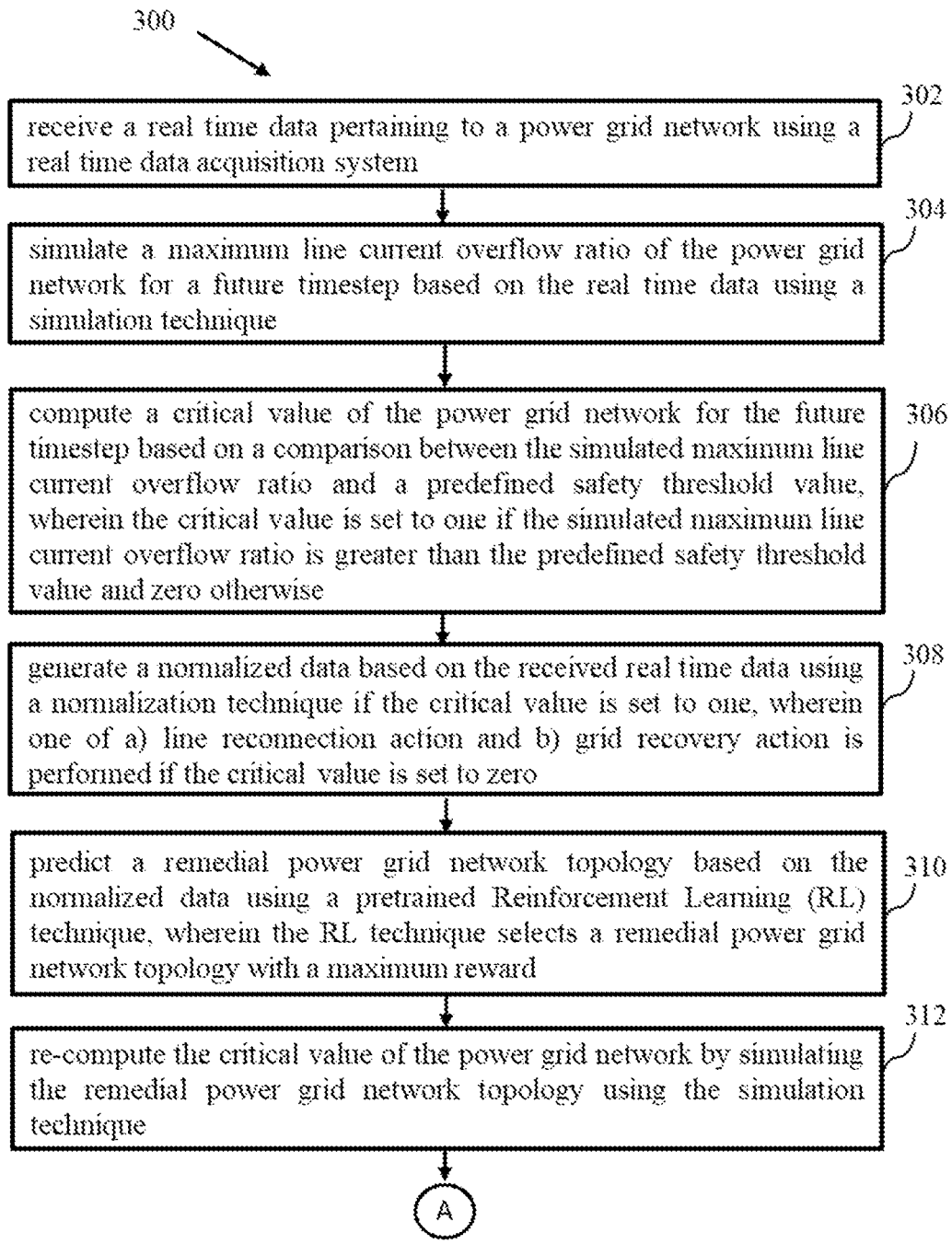
FIGS. 3A and 3B are exemplary flow diagrams illustrating a processor implemented method for reinforcement learning and heuristic based real time power grid management implemented by the system of FIG. 1, in accordance with some embodiments of the present disclosure.
Figure 3B:
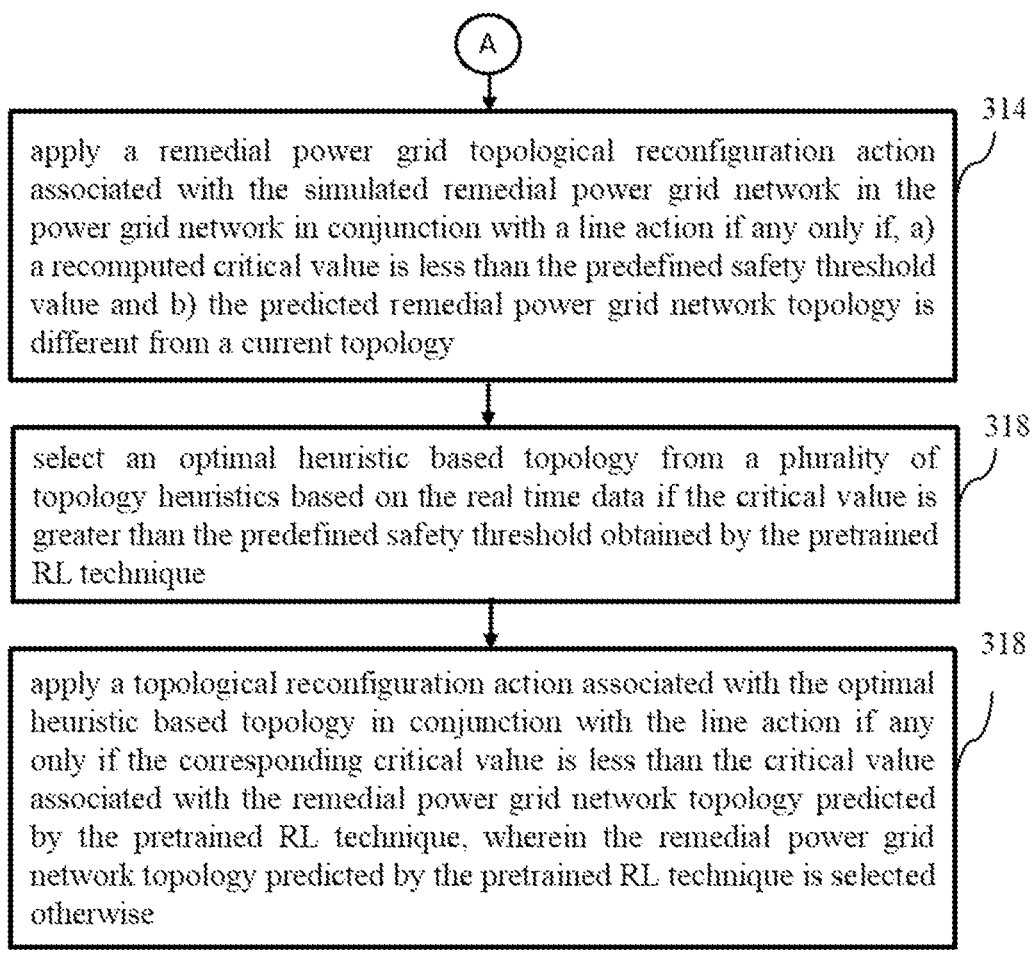

FIGS. 3A and 3B are exemplary flow diagram illustrating a method 300 for reinforcement learning and heuristic based real time power grid management implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and FIG. 2 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

In an embodiment, a power network comprises of several substations connected with each other through transmission lines. Each substation is equipped with electrical elements, such as generators and/or loads. The generators produce power, only to be consumed by the network loads and through transmission losses. The power lines are subjected to maximum current (power) carrying capacities, and an excess flow through power lines for a substantial duration result in permanent damage and eventual disconnection from the network. A substation acts as a router in the network and determines where to transmit power. Additionally, a substation is also equipped with multiple conductors, known as buses.

The problem of controlling power networks can be cast as a Markov Decision Process (MDP). An MDP is denoted by the tuple $\langle S, A, P_A, r \rangle$, where S and A represent the finite set of states and actions, respectively. For each s, s'∈S, the probability of transition from s→s' under the effect of an action a∈A, is denoted by $p_a(s, s')$∈PA. Finally, the step-reward associated with each state-action pair (s, a) is depicted by r(s, a). Below, the set of all possible states, actions and reward are summarized.

States: Agents can access the entire state of the power network at each time-step, including the demand forecast at the next step, load flow and status of power lines, voltages at each busbar, production at each generator, and various operational constraints Actions: Grid2Op (open source simulator) is equipped with two kinds of actions: (a) combinatorial (or discrete), (b) continuous. Discrete actions are related to inexpensive topological actions, such as line disconnection/reconnection, or actions at the busbar. Additionally, the generators can be re-dispatched through predefined continuous actions using costly production changes. For the reduced Institute of Electrical and Electronics Engineers (IEEE)-118 system, there are nearly 70 k discrete actions and 40 continuous actions.

Rewards: The L2RPN challenge is equipped with a competition specific reward, however, Grid2Op also facilitates inclusion custom reward functions.

At step 302 of the method 300, the one or more hardware processors 102 are configured by the programmed instructions to receive a real time data pertaining to a power grid network using a real time data acquisition system. In an embodiment, Supervisory Control And Data Acquisition (SCADA) system is used for capturing the real time data from power grid network. For example, the real time data includes time-step information, generator features, load features, line features, current topological vectors and the like.

At step 304 of the method 300, the maximum line current overflow ratio computation module 202 executed by one or more hardware processors 102 is configured by the programmed instructions to simulate a maximum line current overflow ratio of the power grid network for a future timestep based on the real time data using a simulation technique. For example, the simulation technique used is Grid2Op (open source simulator). The line/transmission line current overflow ratio is defined as the rated ratio of current, i.e., the observed current flow divided by the thermal limit of each powerline.

At step 306 of the method 300, the critical value computation module 204 executed by the one or more hardware processors 102 is configured by the programmed instructions to compute a critical value of the power grid network for the future timestep based on a comparison between the simulated maximum line current overflow ratio and a predefined safety threshold value. The critical value is set to one if the simulated maximum line current overflow ratio is greater than the predefined safety threshold value and zero otherwise. The predefined safety threshold is computed based on an objective to maintain a sufficient balance between exploration and Reinforcement Learning (RL) agent learning associated with the RL technique.

At step 308 of the method 300, the normalization module 206 executed by the one or more hardware processors 102 is configured by the programmed instructions to generate a normalized data based on the received real time data using a normalization technique if the critical value is set to one.

At step 310 of the method 300, the prediction module 208 executed by the one or more hardware processors 102 is configured by the programmed instructions to predict a remedial power grid network topology based on the normalized data using a pretrained RL technique. The RL technique selects a remedial power grid network topology with a maximum reward.

In an embodiment, the RL technique is trained using Proximal Policy Optimization (PPO) technique. To train the RL technique for optimal sequential decision making, the on-policy PPO agent is trained with a prioritized replay buffer defined over the set of network states. The state of the agent $S_t \in S$ at time-step t consists of: (a) the time-step information t including the month, date, hour, minute and day of week information. (b) generator features $F_{gen}$ comprising of active ($P_{gen}$) and reactive ($Q_{gen}$) generation, and the voltage magnitude $V_{gen}$. (c) load features $F_{load}$ comprising of active ($P_{load}$) and reactive ($Q_{load}$) consumption, and the voltage magnitude $V_{load}$. (d) line features $F_{line}$ which include active ($P_{or}$, $P_{ex}$) and reactive ($Q_{or}$, $Q_{ex}$) power flows, as well as the bus voltages ($V_{or}$, $V_{ex}$) and current flow ($a_{or}$, $a_{ex}$), at both ends of the line. The other important line features are the power flow capacity ρ a ratio to capture the amount of overflow in a line, timestep overflow $t_{of}$ to depict the duration of time steps since a line has over-flowed, and line status $I_l$ to indicate if the line is connected or disconnected in the network. (e) Additionally, the state space also includes the topological vector status $I_{topo\_vect}$ to indicate on which bus each object of the power grid is connected in the substation. (f) The grid operator may have to wait for some time steps before a line or a substation can be acted upon, denoted. by the line cooldown time step $t_l$ and substation cooldown time step $t_s$. (g) Power lines can go under some planned maintenance; the information of the time of next planned maintenance $t_{nm}$ and its duration $t_d$ is also included in the input features, and as an agent can't operate on lines under maintenance. In summary, the state of the PPO agent is given by:

$$S_t := [t, F_{gen}, F_{load}, F_{line}, I_l, \rho, I_{topo\_vect}, t_{of}, t_l, t_s, t_{nm}, t_d]$$

The step reward for training the PPO agent is designed to incur additional penalty when the maximum overflow ratio $\rho_{max}$ is beyond the safety threshold of 0.95, i.e., $$r = \begin{cases} 2 - \rho_{max}, & \text{if } \rho_{max} < 0.95. \\ 2 - 2\rho_{max}, & \text{else} \end{cases}$$

Additionally, the agent is incentivized through an episodic reward of 500 upon surviving the entire episode. Premature termination of the episode due to any illegal action, or grid blackout is penalized through an episodic reward of −300.

In an embodiment, the PPO architecture includes actor and critic networks. The actor network produces the probability distribution of all possible actions, and the critic network evaluates the goodness of the action suggested by the actor. The actor network includes four fully connected layers with Rectified Linear activation Unit (ReLU) activation. The output layer is a linear layer of dimension equal to the number of discrete actions (for example, 206 actions). The critic network uses a single hidden layer (with ReLU activation) of dimension 64. The output dimension of the critic network is 1.

In an embodiment the PPO based RL is trained as follows: The RL agent is engaged only when the maximum line overflow exceeds the safety threshold. During the critical events, the normalized data is given to the actor model of the PPO, it provides the probability distribution of all topological actions, and the optimal remedial topological reconfiguration action is selected using the Gumble-max trick. The critic model evaluates the goodness of the action proposed by actor. If any line can be reconnected, the topological reconfiguration action combines with it. The legal action is implemented on the power network, and transition is stored in the prioritized replay buffer. In the next timestep, the critical value is obtained, and if it is 0, RL-agent dis-engage itself and either line action or do-nothing action is selected. A long sequence of such transitions is stored in prioritized replay buffer (around 20 k) in each epoch during the training of the RL agent. In an embodiment, the clipped PPO algorithm trained in PyTorch using Adam optimizer with a learning rate of 0.003, clip range of 0.2, rate/discount factor (γ) of 0.99, and generalized advantage estimation (λ) of 0.95. A single PPO agent trained on the 36 parallel environments inside Grid2Op.

At step 312 of the method 300, the critical value re-computation module 210 executed by the one or more hardware processors 102 is configured by the programmed instructions to recompute the critical value of the power grid network by simulating the remedial power grid network topology using the simulation technique.

Figure 4:
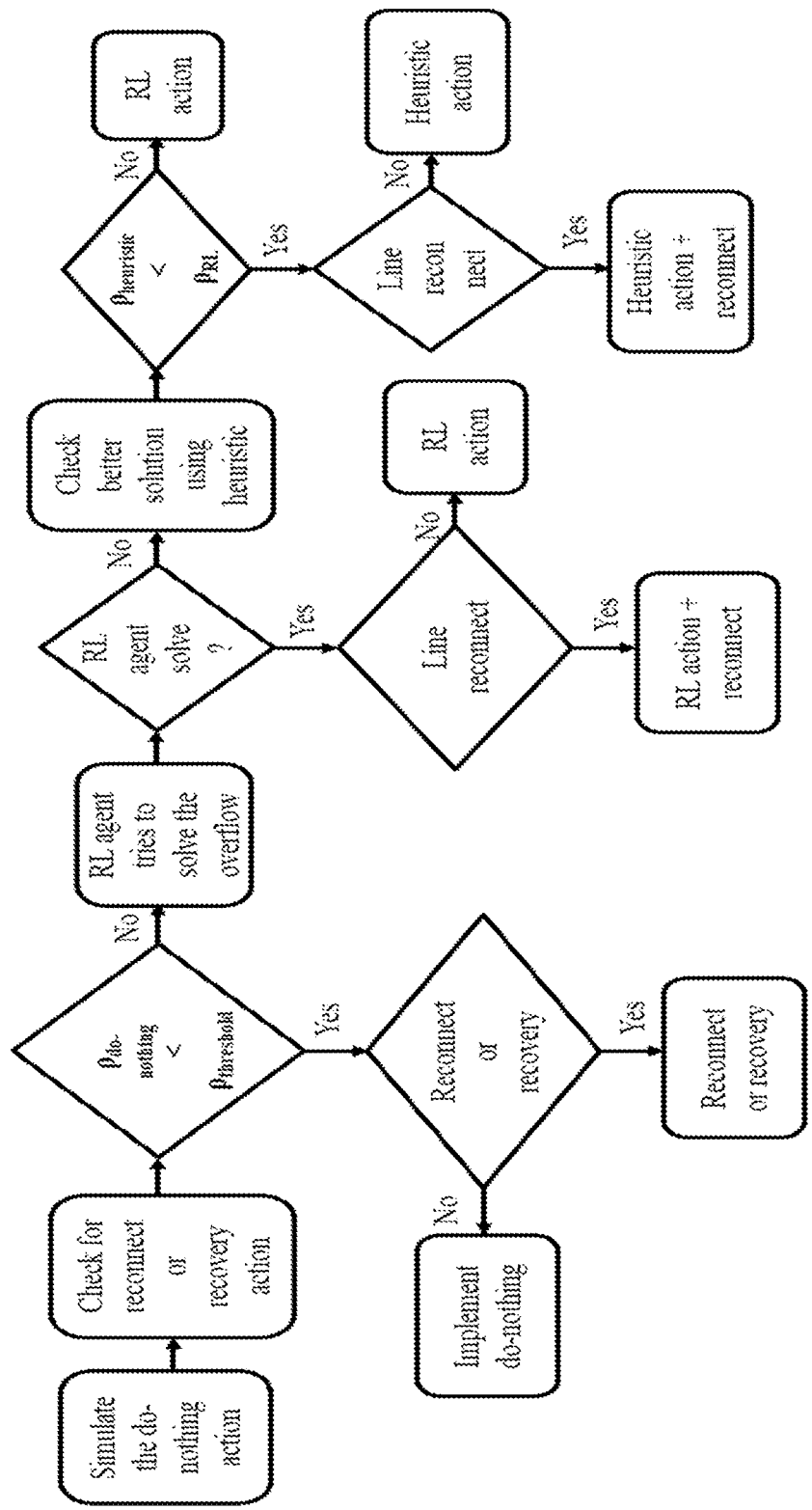
FIG. 4 is an example flow diagram depicting selection of an optimal action for the processor implemented method for reinforcement learning and heuristic based real time power grid management implemented by the system of FIG. 1, in accordance with some embodiments of the present disclosure.

At step 314 of the method 300, the remedial reconfiguration action application module 212 executed by the one or more hardware processors 102 is configured by the programmed instructions to apply a remedial power grid topological reconfiguration action associated with the simulated remedial power grid network in the power grid network if, a) a recomputed critical value is less than the predefined safety threshold value and b) the predicted remedial power grid network topology is different from a current topology. For example, the remedial reconfiguration action includes a line disconnection/reconnection in a fixed topology network In an embodiment, an optimal action selection in the power grid network during adversarial attacks (explained using FIGS. 3A and 3B) is explained in conjunction with FIG. 4. Now referring to FIG. 4, given the current state $S_t$ of the power system and overflow status of all power lines, the agent first simulates (not implements) the do-nothing action and obtains the simulated $\rho_{do\text{-}nothing}$. Here $\rho_{do\text{-}nothing}$ is the critical value of the power grid network. If $\rho_{do\text{-}nothing}$ is within the safety threshold, then the agent implements either the do-nothing action or the recovery action in case the current topology is different from the initial topology. In an event of overflow with $\rho_{do\text{-}nothing}$ exceeding the safety threshold, the present disclosure (present disclosure) framework implements the action recommended by the RL agent in conjunction with any possible line reconnection action. The performance of the present disclosure agent depends on the choice of safety threshold $\rho_{threshold}$. In scenarios where the network is under severe attack from the adversaries, the present disclosure framework needs to perform aggressive topological reconfiguration actions by frequently invoking the RL agent. This can be achieved by setting a smaller value of the safety threshold.

At step 316 of the method 300, the optimal heuristic topology selection module 214 executed by the one or more hardware processors 102 is configured by the programmed instructions to select an optimal heuristic based topology from a plurality of topology heuristics based on the real time data if the critical value is greater than the predefined safety threshold obtained by the pretrained RL technique.

At step 318 of the method 300, the heuristic based reconfiguration action application module 216 executed by the one or more hardware processors 102 is configured by the programmed instructions to apply a topological reconfiguration action associated with the optimal heuristic based topology if the corresponding critical value is less than the critical value associated with the remedial power grid network topology predicted by the pretrained RL technique. The remedial power grid network topology predicted by the pretrained RL technique is selected otherwise.

FIG. 4 is an example flow diagram for selecting an optimal action for the processor implemented method for reinforcement learning and heuristic based real time power grid management implemented by the system of FIG. 1, in accordance with some embodiments of the present disclosure

EXPERIMENTATION DETAILS

In an embodiment, the present disclosure was experimented in L2RPN challenge dataset built upon an open-source simulator (Grid2Op), for power grid operation. Grid2Op offers flexibility to work with realistic scenarios, execute contingency events, and test control algorithms subjected to several physical and operational constraints. The challenge scenario consists of industry standard synthetic IEEE-118 network with 36 substations, 59 lines and 22 generators. The remainder of the IEEE-118 network is represented as a time varying load. Grid2Op considers 2 buses per substation, also known as the double busbar system. Grid2Op environment is also equipped with realistic production and consumption scenarios, as well as adversarial attacks on the network manifested as forced line failures. The agents can take remedial actions subjected to following constraints: (a) Deterministic events, such as maintenance, and adversarial events, such as meteorological conditions, can disconnect lines for substantial duration (b) Each power line has a maximum flow capacity, and gets disconnected automatically if overloaded for too long (c) Disconnected lines cannot be immediately reconnected (d) Agents cannot act too frequently on the same line, generator or substation in order to avoid asset degradation The episode terminates when the total load demand is not met or during incidents of wide-area blackout.

In an embodiment, the dataset used for training present disclosure is part of the small dataset included with the L2RPN starting kit. It consists of power grid data worth 48 years spaced out at an interval of 5 minutes amounting to a total training data of 4,644,864 steps. The dataset is based on the reduced IEEE-118 system with 22 generators, 36 substations, 37 loads, and 59 power lines. some of the loads in this dataset represent interconnection with another grid. This dataset uses the Grid2Op framework to facilitate sequential decision-making process.

In an embodiment, the present disclosure is tested using two different test datasets (a) an offline dataset included with the starting kit for participants to evaluate the performance of their trained models, (b) an online dataset that is hidden from the participants and the performance of the RL agent is analyzed. The participants can directly upload their trained models on the competition Codalab to get them evaluated and ranked. Both these datasets contain 24 episodic weekly scenarios resolved at a 5-minute interval. The hidden dataset was carefully picked to offer the different levels of toughness that might not have been observed during the training phase, even though both the datasets were generated from a similar statistical distribution. The third test dataset includes 10 different 3-day-long (864 steps) episodic scenarios, picked in order to offer different levels of difficulty. In this work, the present disclosure framework is benchmarked on all three publicly available datasets.

In an embodiment, the present disclosure runs on Grid2Op, which uses the Gym interface to interact with an agent. This Grid2Op platform emulates the sequential decision-making in the power system, where each episode is divided into a list of states each corresponding to a time step of 5 minutes. Each of these states is described by the power flow at any given time step, which in turn is described by the amount of electricity supplied or consumed by the generators and loads, respectively. This data on power flow in each state is provided in the form of power network architecture, consumption, and generation by an electricity transmission system operator.

In an embodiment, the PPO model associated with the present disclosure was trained on the L2RPN NeurIPS robustness track data. As the name suggests, the clipped PPO architecture clips the objective function (ratio between the new and the old policy scaled by the advantages), to remove incentives if the new policy gets too far from the older policy. The clipped PPO architecture consists of actor and critic networks; the actor produces the logits/probability distribution of all possible actions, and the critic evaluates the goodness of the action suggested by the actor. The RL agent is engaged only when the maximum line overflow exceeds the safety threshold. Any such transition is stored in the prioritized replay buffer, and a long sequence of transitions is sampled (around 20 k) in each epoch during the training.

In an embodiment, the performance of the proposed present disclosure agent with baselines is evaluated over the three different test datasets mentioned above. Each scenario is evaluated/scored based on the operation cost and the losses due to blackout and it has been identified that the present disclosure outperforms the conventional approaches.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of reinforcement learning and heuristic based real time power grid management. The present disclosure provides a heuristic-guided RL framework, present disclosure, for robust control of power networks subjected to production and demand uncertainty, as well as adversarial attacks. Using a careful action selection process, in combination with line reconnection and recovery heuristics, equips present disclosure to outperform SOTA approaches on several challenge datasets even with reduced action space. present disclosure not only diversifies its actions across substations, but also learns to identify important action sequences to protect the network against targeted adversarial attacks.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
    receiving, via one or more hardware processors, a real time data pertaining to a power grid network using a real time data acquisition system;
    simulating, via the one or more hardware processors, a maximum line current overflow ratio of the power grid network for a future timestep based on the real time data using a simulation technique;
    computing, via the one or more hardware processors, a critical value of the power grid network for the future timestep based on a comparison between the simulated maximum line current overflow ratio and a predefined safety threshold value, wherein the critical value is set to one if the simulated maximum line current overflow ratio is greater than the predefined safety threshold value and zero otherwise;
    generating, via the one or more hardware processors, a normalized data based on the received real time data using a normalization technique if the critical value is set to one, wherein one of a) line reconnection action and b) grid recovery action is performed if the critical value is set to zero;
    predicting, via the one or more hardware processors, a remedial power grid network topology based on the normalized data using a pretrained Reinforcement Learning (RL) technique, wherein the RL technique selects a remedial power grid network topology with a maximum reward;
    recomputing, via the one or more hardware processors, the critical value of the power grid network by simulating the remedial power grid network topology using the simulation technique;
    applying, via the one or more hardware processors, a remedial power grid topological reconfiguration action associated with the simulated remedial power grid network in the power grid network in conjunction with a line action if any, only if, a) a recomputed critical value is less than the predefined safety threshold value and b) the predicted remedial power grid network topology is different from a current topology;
    selecting, via the one or more hardware processors, an optimal heuristic based topology from a plurality of topology heuristics based on the real time data if the critical value is greater than the predefined safety threshold obtained by the pretrained RL technique; and
    applying, via the one or more hardware processors, a topological reconfiguration action associated with the optimal heuristic based topology in conjunction with the line action if any only if the corresponding critical value is less than the critical value associated with the remedial power grid network topology predicted by the pretrained RL technique, wherein the remedial power grid network topology predicted by the pretrained RL technique is selected otherwise;
    wherein the real time data pertaining to the power grid network comprises time-step information, generator features, load features, line features and current topological vectors.

2. The processor implemented method of claim 1, wherein the RL technique is trained using Proximal Policy Optimization (PPO) technique.

3. The processor implemented method of claim 1, wherein the predefined safety threshold is computed based on an objective to maintain a sufficient balance between exploration and RL agent learning associated with the RL technique.

4. The processor implemented method of claim 1, wherein the line action comprises line disconnection and reconnection actions.

5. A system comprising:
    at least one memory storing programmed instructions; one or more Input/Output (I/O) interfaces; and one or more hardware processors operatively coupled to the at least one memory, wherein the one or more hardware processors are configured by the programmed instructions to:

receive a real time data pertaining to a power grid network using a real time data acquisition system;

simulate a maximum line current overflow ratio of the power grid network for a future timestep based on the real time data using a simulation technique;

compute a critical value of the power grid network for the future timestep based on a comparison between the simulated maximum line current overflow ratio and a predefined safety threshold value, wherein the critical value is set to one if the simulated maximum line current overflow ratio is greater than the predefined safety threshold value and zero otherwise;

generate a normalized data based on the received real time data using a normalization technique if the critical value is set to one, wherein one of a) line reconnection action and b) grid recovery action is performed if the critical value is set to zero;

predict a remedial power grid network topology based on the normalized data using a pretrained Reinforcement Learning (RL) technique, wherein the RL technique selects a remedial power grid network topology with a maximum reward;

recompute the critical value of the power grid network by simulating the remedial power grid network topology using the simulation technique;

apply a remedial power grid topological reconfiguration action associated with the simulated remedial power grid network in the power grid network in conjunction with a line action if any, only if, a) a recomputed critical value is less than the predefined safety threshold value and b) the predicted remedial power grid network topology is different from a current topology;

select an optimal heuristic based topology from a plurality of topology heuristics based on the real time data if the critical value is greater than the predefined safety threshold obtained by the pretrained RL technique; and apply a topological reconfiguration action associated with the optimal heuristic based topology in conjunction with the line action if any only if the corresponding critical value is less than the critical value associated with the remedial power grid network topology predicted by the pretrained RL technique, wherein the remedial power grid network topology predicted by the pretrained RL technique is selected otherwise;

wherein the real time data pertaining to the power grid network comprises time-step information, generator features, load features, line features and current topological vectors.

6. The system of claim 5, wherein the RL technique is trained using Proximal Policy Optimization (PPO) technique.

7. The system of claim 5, wherein the predefined safety threshold is computed based on an objective to maintain a sufficient balance between exploration and RL agent learning associated with the RL technique.

8. The system of claim 5, wherein the line action comprises line disconnection and reconnection actions.

9. One or more non-transitory machine readable information storage mediums comprising one or more instructions which when executed by one or more hardware processors causes:

receiving a real time data pertaining to a power grid network using a real time data acquisition system;

simulating a maximum line current overflow ratio of the power grid network for a future timestep based on the real time data using a simulation technique;

computing a critical value of the power grid network for the future timestep based on a comparison between the simulated maximum line current overflow ratio and a predefined safety threshold value, wherein the critical value is set to one if the simulated maximum line current overflow ratio is greater than the predefined safety threshold value and zero otherwise;

generating a normalized data based on the received real time data using a normalization technique if the critical value is set to one, wherein one of a) line reconnection action and b) grid recovery action is performed if the critical value is set to zero;

predicting a remedial power grid network topology based on the normalized data using a pretrained Reinforcement Learning (RL) technique, wherein the RL technique selects a remedial power grid network topology with a maximum reward;

recomputing the critical value of the power grid network by simulating the remedial power grid network topology using the simulation technique;

applying a remedial power grid topological reconfiguration action associated with the simulated remedial power grid network in the power grid network in conjunction with a line action if any, only if, a) a recomputed critical value is less than the predefined safety threshold value and b) the predicted remedial power grid network topology is different from a current topology;

selecting an optimal heuristic based topology from a plurality of topology heuristics based on the real time data if the critical value is greater than the predefined safety threshold obtained by the pretrained RL technique; and applying a topological reconfiguration action associated with the optimal heuristic based topology in conjunction with the line action if any only if the corresponding critical value is less than the critical value associated with the remedial power grid network topology predicted by the pretrained RL technique, wherein the remedial power grid network topology predicted by the pretrained RL technique is selected otherwise;

wherein the real time data pertaining to the power grid network comprises time-step information, generator features, load features, line features and current topological vectors.

10. The one or more non-transitory machine-readable information storage mediums of claim 9, wherein the RL technique is trained using Proximal Policy Optimization (PPO) technique.

11. The one or more non-transitory machine-readable information storage mediums of claim 9, wherein the predefined safety threshold is computed based on an objective to maintain a sufficient balance between exploration and RL agent learning associated with the RL technique.

12. The one or more non-transitory machine-readable information storage mediums of claim 9, wherein the line action comprises line disconnection and reconnection actions.

* * * * *